United States Patent
Haardt

(10) Patent No.: US 7,158,793 B2
(45) Date of Patent: Jan. 2, 2007

(54) BEAM-SHAPING METHOD

(75) Inventor: Martin Haardt, Geraberg (DE)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 10/399,108

(22) PCT Filed: Oct. 12, 2001

(86) PCT No.: PCT/DE01/03923

§ 371 (c)(1),
(2), (4) Date: Apr. 16, 2003

(87) PCT Pub. No.: WO02/33850

PCT Pub. Date: Apr. 25, 2002

(65) Prior Publication Data

US 2004/0014434 A1 Jan. 22, 2004

(30) Foreign Application Priority Data

Oct. 16, 2000 (DE) .............................. 100 51 133

(51) Int. Cl.
*H04Q 7/20* (2006.01)
(52) U.S. Cl. ............... 455/450; 455/103; 455/562.1; 342/368; 342/373

(58) Field of Classification Search ............... 455/103, 455/562.1; 342/368, 373
See application file for complete search history.

(56) References Cited

U.S. PATENT DOCUMENTS

| 5,634,199 A | 5/1997 | Gerlach et al. ............... 455/63 |
| 5,886,988 A | 3/1999 | Yun et al. ................... 370/329 |
| 5,901,075 A * | 5/1999 | Offord et al. .......... 364/724.19 |
| 5,999,800 A * | 12/1999 | Choi et al. .................... 455/73 |
| 6,154,661 A * | 11/2000 | Goldburg ................. 455/562.1 |
| 6,317,612 B1* | 11/2001 | Farsakh ................... 455/67.11 |
| 2003/0144032 A1* | 7/2003 | Brunner et al. ............. 455/562 |
| 2005/0195915 A1* | 9/2005 | Raleigh et al. ............. 375/267 |

FOREIGN PATENT DOCUMENTS

| DE | 19803188 A1 | 7/1999 |
| DE | 10032426 A1 | 1/2002 |
| EP | 0899896 A1 | 3/1999 |
| WO | WO98/43106 | 10/1998 |

* cited by examiner

*Primary Examiner*—Quochien B. Vuong
*Assistant Examiner*—Tuan H. Nguyen
(74) *Attorney, Agent, or Firm*—Staas & Halsey LLP

(57) ABSTRACT

A method for shaping beams in a radio communication system employs current weighting vectors determined from first weighting vectors. The first weighting vectors used for the beam shaping are chosen to be orthogonal to each other.

19 Claims, 3 Drawing Sheets

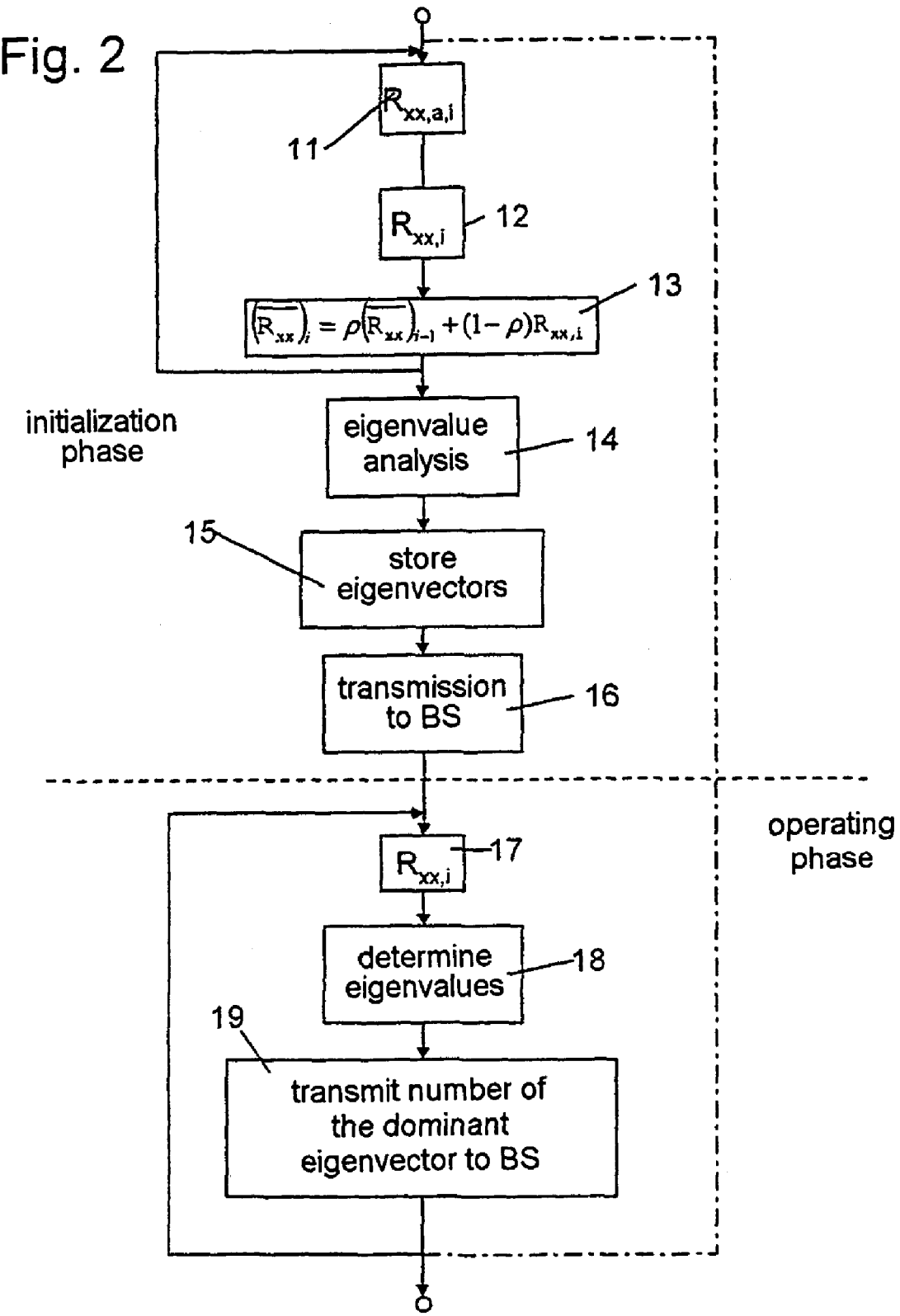

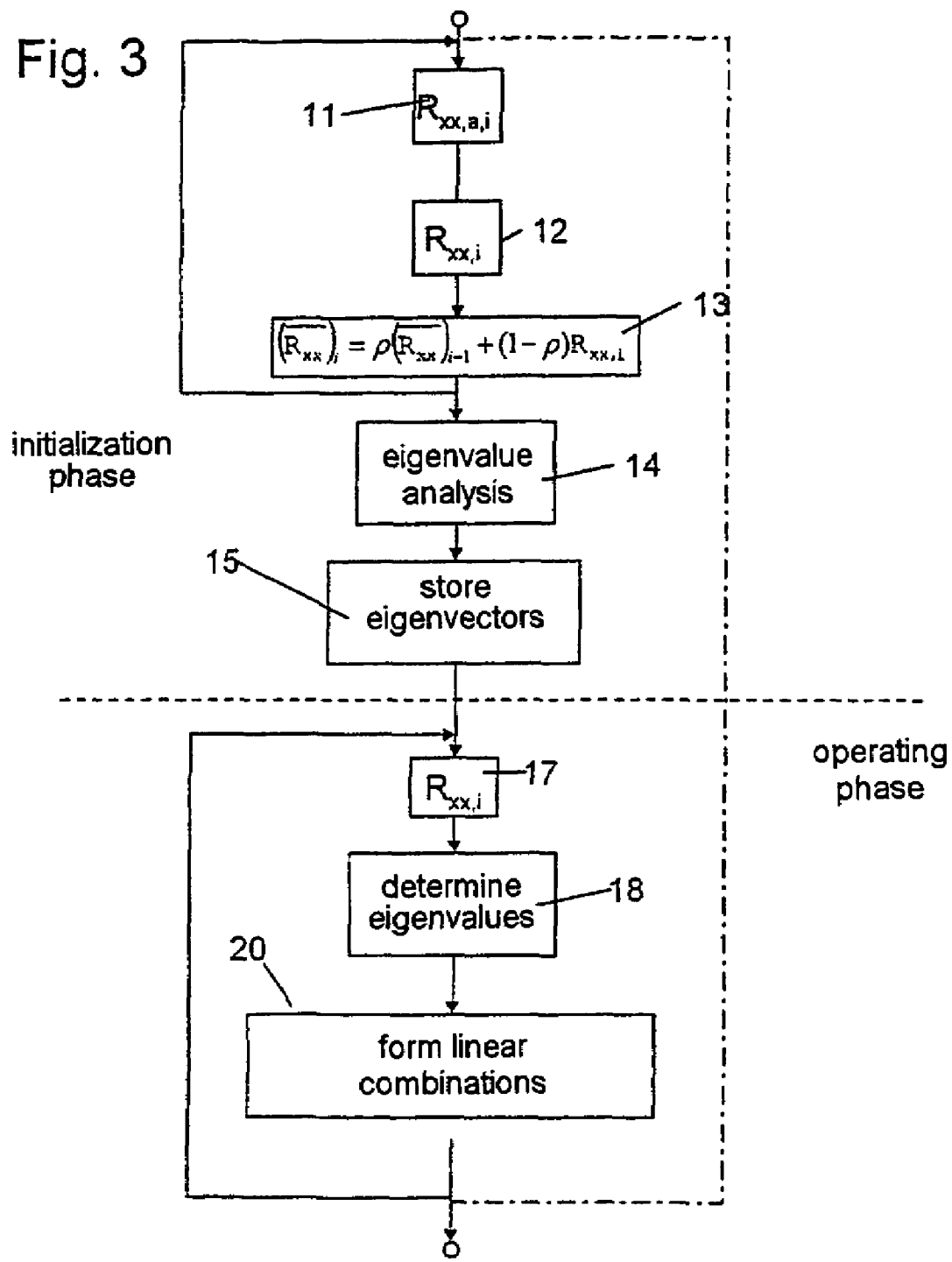

BEAM-SHAPING METHOD

CROSS REFERENCE TO RELATED APPLICATIONS

This application is based on and hereby claims priority to PCT Application No. PCT/DE01/03923 filed on 12 Oct. 2001 and German Application No. 100 51 133.3 filed on 16 Oct. 2000, the contents of which are hereby incorporated by reference.

BACKGROUND OF THE INVENTION

The invention relates to a beam shaping method.

In the embodiments of the beam shaping method described in this application, covariance matrices are calculated singly for all sufficiently strong taps of a radio signal, eigenvectors and eigenvalues of the covariance matrices thus obtained are calculated and the eigenvectors corresponding to the strongest eigenvalues are used for the beam shaping.

The number of eigenvalues which can be used in practice in the beam shaping is limited. There are different types of reasons for this.

In a method as described with reference to FIG. 4 of patent application DE 10032426.6, a problem lies in the limited bandwidth which is available for transmitting information describing the receiving situation back from the subscriber station to the base station and which must be divided into the transmission of components of the measured eigenvectors, which are valid or usable over relatively long periods, on the one hand, and on the other hand, a desired short-term weighting of these eigenvectors in the downlink signal. This makes it necessary to restrict oneself to the transmission of only the most important eigenvectors in the interest of rapid updating of the weighting.

In the method described with reference to FIG. 5 of patent application DE 10032426.6, the base station uses a linear combination of eigenvectors as weighting vectors for radiating. A greater number of eigenvectors used the greater the number of propagation paths covered with the radio signal, both to the subscriber station for which the signal is intended and to other stations for which the signal represents interference. To keep this interference within limits, the number of eigenvectors included in the linear combination must be limited.

SUMMARY OF THE INVENTION

It is one possible object of the invention to specify a beam shaping method in which the greatest possible protection against fading drop-outs is achieved even with a limited number of eigenvectors simultaneously taken into consideration.

One aspect of the invention is based on the finding that, under certain conditions of propagation, limiting the number of eigenvectors can lead to problems (Canyon effect) as is shown in FIG. 1. This figure illustrates the transmission conditions which can easily occur, e.g. in the canyons of the streets of a large city. There is no direct transmission path (line-of-sight path) between the base station BS and a subscriber station MS. There are three indirect transmission paths M1, M2, M3, of which the transmission paths M1, M2 are partially coincident.

The base station BS has an adaptive antenna with M elements and it is assumed that the number of eigenvectors taken into consideration in the beam shaping by the base station BS is limited to two.

When the base station BS carries out the method described with reference to FIG. 5 of patent application 10032426.6, there is the possibility that the strongest eigenvalues correspond to the transmission paths M1, M2 in each case and that, in consequence, the base station uses a linear combination of the eigenvectors corresponding to these two propagation paths in the beam shaping. In such a case, it generates two beams which extend in the same direction from the base station.

The partial coincidence of the propagation paths inevitably results in a correlation between them, i.e. if one of them experiences extinction, there is an increase in the probability of extinction of the second one, and thus the probability that no further communication is possible between base station and subscriber station.

A similar problem also exists in the method described with reference to FIG. 4 of patent application 10032426.6. In this case, the eigenvectors corresponding to the propagation paths M1, M2 are not used simultaneously but following one another. Here, too, however, the risk that both propagation paths M1, M2 are simultaneously affected by extinction is greater than in the case of two non-overlapping propagation paths such as, for instance, M1 and M3.

To eliminate this problem, a method for beam shaping in a radio communication system is proposed, the radio communication system comprising subscriber stations and a base station which has an antenna apparatus with a plurality of antenna elements which radiate a downlink signal in each case weighted with coefficients $w_i$, i=1, ..., M of a current weighting vector w, in which a plurality of first weighting vectors $w^{(j)}$ are formed in an initialization phase, and the current weighting vector w, used for radiating a time slot of the downlink signal intended for the subscriber station (MSk), is cyclically redetermined in an operating phase by the first weighting vectors formed, the first weighting vectors $w^{(j)}$ being determined with the stipulation that they are all orthogonal to one another.

A particularly simple possibility of ensuring the orthogonality of the first weighting vectors formed is to set up a single first spatial covariance matrix which is composed of contributions of short-term covariance matrices determined for the individual taps of the uplink or downlink signal, and to select the first weighting vectors among their eigenvectors. In particular, this first covariance matrix can be obtained by forming a mean value of the short-term covariance matrices obtained for the individual taps. Since this first spatial covariance varies only slowly, it can also be called a "long-term" covariance matrix in contrast to the short-term covariance matrices. Since the eigenvectors of a covariance matrix are orthogonal, the desired orthogonality thus occurs by itself taking into consideration only a single first spatial covariance matrix.

The short-term covariance matrices are also suitably averaged in time for determining the first spatial covariance matrix. Thus, the short-term covariance matrices can be used at the same time as second spatial covariance matrices in the sense of patent application 10032426.6.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a flowchart of the method according to the invention in accordance with a first embodiment; and FIG. 3 shows a flowchart of the method according to the invention in accordance with a second embodiment.

DETAILED DESCRIPTION OF THE PREFERRED EMBODIMENT

Figure 1:
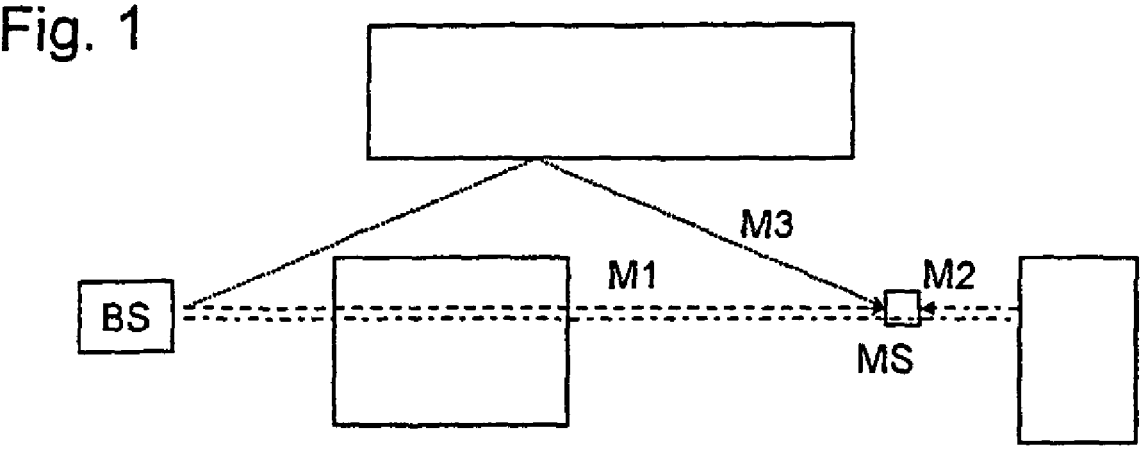
FIG. 1 shows a typical environment for the application of the method according to one aspect of the invention.

Reference will now be made in detail to the preferred embodiments of the present invention, examples of which are illustrated in the accompanying drawings, wherein like reference numerals refer to like elements throughout.

The configuration of a base station and of a subscriber station which are suitable for carrying out the method proposed by the inventor have been described in U.S. patent application Ser. No. 10/312,769 filed on Dec. 30, 2002, which is hereby incorporated by reference. FIGS. 2 and 3 and the related description, are particularly relevant, the description will, therefore, not be repeated here.

The first embodiment of the method is described with reference to FIG. 2.

In an initialization phase, the signal processor SP of the subscriber station MS determines in step 11 by training sequences, transmitted in an i-th time slot of the downlink signal, individually for each tap of the downlink signal the impulse responses of each antenna element $AE_1, \ldots, AE_M$. (Naturally, "each" tap does not mean the totality of all contributions in the received signal which may be detectable but only all those which can actually be detected and isolated by the receiver of the subscriber station or only those which have a sufficient signal strength so that their evaluation can improve the reliability of the symbol estimation.) These impulse responses are assembled by the signal processor SP in the manner known e.g. from the quoted DE 198 03 188 to form spatial covariance matrices $R_{xx,a,i}$ where a is an index of a tap. These spatial covariance matrices $R_{xx,a,i}$ are supplied to a computing unit RE.

In step 12, the computing unit RE forms a mean value $R_{xx,i}$ of the covariance matrices $R_{xx,a,i}$ supplied by the signal processor SP for the i-th time slot, in that it adds them and divides the result by the number of taps. (Since only the proportions of the coefficients of this averaged matrix are of importance for the purposes of the method, the division step can also be omitted.) The matrix thus obtained is called short-term or second spatial covariance matrix.

In step 13, the computing unit RE forms a sequence of temporal mean values $\overline{R_{xx,i}}$ of the short-term covariance matrices in accordance with the following formula:

$$(\overline{R_{xx}})_i = \rho(\overline{R_{xx}})_{i-1} + (1-\rho)R_{xx,i} \text{ for all } i > 1,$$

$$(\overline{R_{xx}})_0 = R_{xx,j},$$

where $(\overline{R_{xx}})_i$ is in each case the i-th averaged covariance matrix, $R_{xx,i}$ is the i-th current covariance matrix and p is a measure of the time constant of the averaging with a value of between 0 and 1.

Steps 11 to 13 are repeated a predetermined number z of times in order to obtain a temporal averaging over an informative period in which fluctuations of the channel estimation due to rapid fading essentially average out. This period can be of the order of magnitude of minutes. ρ is selected in such a manner that the contribution of $R_{xx,0}$ to the mean value $(\overline{R_{xx}})_z$ is not negligible compared with that of $(\overline{R_{xx}})_z$. In the text which follows, the mean value $(\overline{R_{xx}})_z$ is called the first or long-term spatial covariance matrix.

This is followed by an analysis of the eigenvalues and eigenvectors of the first covariance matrix $(\overline{R_{xx}})_z$ (step 14).

The analysis can extend to all eigenvectors and eigenvalues of the covariance matrix $(\overline{R_{xx}})_z$ and, in the case considered here, a control unit KE finds among the eigenvectors found in the analysis a limited number, e.g. 2 or 4, which have the eigenvalues with the highest amounts and which, in consequence, correspond to the transmission paths having the least attenuation. As an alternative, a method for eigenvector analysis can be used which supplies the eigenvectors of the first spatial covariance matrix $(\overline{R_{xx}})_z$ in the order of decreasing amounts of the eigenvalues and which is terminated when the limited number of eigenvectors has been formed. Methods of information theory which can be used for determining the dominant eigenvectors of a covariance matrix are described e.g. in the report by M. Wax and T. Kailath, "Detection of signals by information theoretic criteria".

The coefficients of the eigenvectors $w^{(k,1)}, w^{(k,2)}, \ldots$ are stored at the subscriber station MS (step 15) and combined with the user data stream coming from the voice processing unit SSV and transmitted via the antenna to the base station (step 16) where they are used as first weighting vectors for the beam shaping. They are received by the base station and stored in its storage unit SE for use as coefficients for the multiplier M of the beam shaping network.

Since these eigenvectors $w^{(k,1)}, w^{(k,2)}, \ldots$ have in each case been obtained from a single second covariance matrix, they are orthogonal; the transmission paths corresponding to them have different directions of arrival at the base station BS and are uncorrelated.

The computing unit RE now changes to an operating phase in which it continues to form short-term covariance matrices (step 17) as described above from the covariance matrices supplied for each tap and each time slot by the signal processor SP and multiplies these by each one of the eigenvectors stored in the storage unit and transmitted to the base station, in order to find the eigenvalues of these vectors for the relevant short-term covariance matrix $R_{xx,i}$ (step 18). The number of the eigenvector having the greater eigenvalue is transmitted to the base station via the control unit KE in step 19. This eigenvector is called the dominant eigenvector because it supplies the strongest and, as a rule, best contribution to the received signal. If only two eigenvectors are stored in the storage element SE and have been transmitted to the base station, one bit is sufficient for designating the eigenvector having the in each case greater eigenvalue. In consequence, if one bit is available per time slot for signaling the characteristics of reception back to the base station, the vector used for the beam shaping by the base station can be updated in each time slot and used for the beam shaping in the subsequent time slot.

If four eigenvalues have been transmitted to the base station, two bits are required for designating the in each case dominant eigenvector. If one bit per time slot is available for transmitting back the characteristics of reception, two time slots are, therefore, required for transmitting the complete designation of the dominant vector. As a consequence, it is used for the beam shaping for the two time slots following its transmission; in the course of these two time slots, the designation of the eigenvector to be used subsequently is transmitted.

The steps of the operating phase can be cyclically repeated many times before the initialization phase has to be carried out again for updating the coefficients of the eigenvectors.

The steps of the two phases are preferably carried out interleaved in time. This means: a short-term covariance matrix is used both for calculating a first spatial covariance matrix which will be transmitted from the subscriber station MS to the base station at a later time, and for calculating the eigenvalues by which the subscriber station selects the dominant one among the eigenvectors formed from an earlier first spatial covariance matrix and transmitted to the base station; in other words: steps 12 and 17 are a single step, the results of which are evaluated differently in steps 13 ff., on the one hand, and, on the other hand, 18 ff.

The eigenvectors can be transmitted at fixed predetermined time intervals from the subscriber station to the base station. However, a variant of the method described above in which the eigenvector analysis is repeated at the averaged covariance matrices $(\overline{R_{xx}})_i$ in short time intervals, e.g. in accordance with the half-amplitude time of the averaging, the eigenvectors thus obtained are compared with the ones previously used and new eigenvectors are only transmitted to the base station when the angles between previous and new eigenvectors exceed a limit value, is more flexible.

If, at the beginning of a transmission link between subscriber station MS and base station BS, no averaged covariance matrix $(\overline{R_{xx}})_i$ is yet available on which an eigenvalue analysis could be performed, data must still be transmitted. In this early phase of the transmission link, predetermined first weighting vectors are used for weighting the downlink signal instead of eigenvectors. The number of these predetermined first weighting vectors is equal to the number of eigenvectors later formed and no greater than the number of antenna elements of the base station. The predetermined first weighting vectors form an ortho-normal system that can be, in particular, a set of vectors of the form (1, 0, 0, . . . ) (0, 1, 0, . . . ) (0, 0, 1, 0, . . . ). Such a choice of the predetermined weighting vectors means that each predetermined weighting vector corresponds to the downlink signal being applied to a single antenna element. Transmitting a designation of a weighting vector to the base station thus provides the subscriber station with the possibility of determining which of the plurality of antenna elements is used for radiating the downlink signal intended for it.

A second embodiment of the method is described with reference to FIG. 3. As will become clear in the text which follows, this embodiment is particularly suitable for application in a radio communication system in which uplink and downlink in each case use the same frequency, i.e. a TDD system. In this embodiment, the first weighting vectors are formed by measurements of the uplink transmission from a subscriber station MS to the base station BS. For this purpose, the base station BS is equipped, like the subscriber station in the case of the method described above with reference to FIG. 2, with a signal processor SP for generating covariance matrices $R_{xx,a,i}$, in each case for one tap and one time slot of the uplink signal, a computing unit RE, a storage element SE etc.

The spatial covariance matrices $R_{xx,a,i}$ generated by the signal processor SP in step 11 are supplied to the computing unit RE which, as described above with reference to the first embodiment, forms from these short-term spatial covariance matrices $R_{xx,i}$ in steps 12, 13, forms their moving mean value and performs in step 14 an eigenvalue and eigenvector analysis on the first long-term spatial covariance matrix $(\overline{R_{xx}})_z$ obtained by the averaging.

These eigenvectors in each case correspond to transmission paths and contain the information about the relative phase angles of the corresponding contribution of the uplink signal at the individual antenna elements and thus about the direction from which the contribution is received. If the frequencies of uplink and downlink are the same as in a TDD radio communication system, the phase information contained in the eigenvector can be used directly for weighting the downlink signal. If the frequencies of uplink and downlink are different, it is necessary to convert the phase information contained in the eigenvector into a corresponding direction, using the uplink frequency as a basis, and to convert this direction back into phase information by the downlink frequency in order to obtain suitable eigenvectors for the beam shaping in the downlink.

The further steps of the method up to and including step 18 again correspond to those of the first embodiment, the difference being that the entire processing takes place at the base station BS and is based on measurements performed on the uplink signal, which is also why transmission step 16 is omitted.

In a first, simple variant of the second embodiment, the eigenvalue determination in step 18 is followed by a step 20 in which a current weighting vector $w^{(k)}$ is calculated by forming a linear combination of the stored eigenvectors $w^{(k,1)}$, $w^{(k,2)}$, . . . , each of the eigenvectors $w^{(k,1)}$, $w^{(k,2)}$, . . . being included in the linear combination with a weight dependent on its eigenvalue obtained in step 18 or its amount. Normalization of the linear combination is possible. This weighting in the formation of the linear combination ensures that those transmission paths having the best transmission characteristics in the short term dominate the downlink signal radiated by the base station. The other eigenvectors included in the current weighting vector $w^{(k)}$ are used for ensuring that a usable signal arrives at the subscriber station even in the case where the transmission path weighted most highly fails from one time slot to the next.

If one of the transmission paths between base station and subscriber station is a line-of-sight link, the eigenvector allocated to this transmission path can be directly used as current weighting vector $w^{(k)}$, in other words, all other eigenvectors are included in the formation of the linear combination with coefficients 0.

According to a further development of the second embodiment, space/time block coding can be performed on the downlink signal as a result of which, for example, two mutually orthogonal sequences with the same information content are obtained from an original transmitted symbol sequence. Each of these sequences is radiated by the base station weighted with one of the eigenvectors, the eigenvalues of which proved to be the largest in step 17.

The invention has been described in detail with particular reference to preferred embodiments thereof and examples, but it will be understood that variations and modifications can be effected within the spirit and scope of the invention.

The invention claimed is:

1. A method for beam shaping in a radio communication system having a plurality of subscriber stations and a base station which has an antenna apparatus with a plurality of antenna elements, comprising:
   transmitting a downlink signal to a subscriber station from each antenna element;
   for each of the antenna elements, weighting the downlink signal transmitted thereby with a weighting coefficient $w_i$, i=1, . . . , M, the weighting coefficients together forming a current weighting vector;
   forming a plurality of first weighting vectors in an initialization phase, the first weighting vectors being formed so as to be orthogonal to one another:
   cyclically redefining the current weighting vector for each time slot of the downlink signal, the current weighting vector being cyclically redefined based on the first weighting vectors;

producing a first spatial covariance matrix of the downlink signal;

determining eigenvectors of the first spatial covariance matrix; and selecting the first weighting vectors from among the eigenvectors of the first spatial covariance matrix, wherein short-term covariance matrices are formed for each tap of the downlink signal; and the first spatial covariance matrix is obtained by averaging the short-term covariance matrices over all taps.

2. The method as claimed in claim 1, wherein the first weighting vectors are formed on the basis of measurements of the downlink signal.

3. The method as claimed in claim 1, wherein the first weighting vectors are formed on the basis of measurements of the uplink signal.

4. The method as claimed in claim 1, wherein the short-term covariance matrices $(\overline{R_{xx}})_i$ are each obtained from a measurement, extending over one time slot of the downlink signal.

5. The method as claimed in claim 4, wherein the first spatial covariance matrix $(\overline{R_{xx}})_z$, which is obtained by averaging the short-term covariance matrices, is a long-term covariance matrix.

6. The method as claimed in claim 1, wherein eigenvalues are obtained for the eigenvectors of the first spatial covariance, and the eigenvectors of the first spatial covariance matrix, which have the greatest, are selected as first weighting vectors.

7. The method as claimed in claim 1, further comprising:

providing short-term covariance matrices for each tap of the downlink signal;

producing a first spatial covariance matrix of the downlink signal by averaging the short-term covariance matrices over all taps;

determining eigenvectors of the first spatial covariance matrix;

cyclically regenerating the short-term covariance matrices to produce regenerated short-term covariance matrices;

modifying the eigenvectors of the first spatial covariance matrix using the regenerated short-term covariance matrices, to thereby produce modified eigenvectors;

calculating eigenvalues for the modified eigenvectors; and selecting the first weighting vectors from among the modified eigenvectors, based on the eigenvalues of the regenerated short-term covariance matrices.

8. The method as claimed in claim 7, wherein the eigenvectors of the first spatial covariance matrix are modified by multiplying the eigenvectors of the first spatial covariance matrix with the regenerated short-term covariance matrices.

9. The method as claimed in claim 1, wherein the current weighting vector is selected from among the first weighting vectors.

10. The method as claimed in claim 1, wherein the current weighting vector is a linear combination of the first weighting vectors.

11. The method as claimed in claim 1, wherein training sequences are transmitted during the initialization phase.

12. The method as claimed in claim 1, wherein the initialization phase is repeatedly performed.

13. The method as claimed in claim 1, further comprising:

producing a first spatial covariance matrix for an uplink signal transmitted from the subscriber stations to the base station, determining eigenvectors of the first spatial covariance matrix; and selecting the first weighting vectors from among the eigenvectors of the first spatial covariance matrix.

14. The method as claimed in claim 13, wherein short-term covariance matrices are formed for each tap of the uplink signal; and the first spatial covariance matrix is obtained by averaging the short-term covariance matrices over all taps.

15. The method as claimed in claim 14, wherein the short-term covariance matrices $(\overline{R_{xx}})_i$ are each obtained from a measurement, extending over one time slot of the uplink signal.

16. The method as claimed in claim 15, wherein the first spatial covariance matrix $(\overline{R_{xx}})_z$, which is obtained by averaging the short-term covariance matrices, is a long-term covariance matrix.

17. The method as claimed in claim 15, wherein eigenvalues are obtained for the eigenvectors of the first spatial covariance, and the eigenvectors of the first spatial covariance matrix, which have the greatest, are selected as first weighting vectors.

18. The method as claimed in claim 15, wherein cyclically regenerating the short-term covariance matrices to produce regenerated short-term covariance matrices;

modifying the eigenvectors of the first spatial covariance matrix using the regenerated short-term covariance matrices, to thereby produce modified eigenvectors;

calculating eigenvalues for the modified eigenvectors; and selecting the first weighting vectors from among the modified eigenvectors, based on the eigenvalues of the regenerated short-term covariance matrices.

19. The method as claimed in claim 18, wherein the eigenvectors of the first spatial covariance matrix are modified by multiplying the eigenvectors of the first spatial covariance matrix with the regenerated short-term covariance matrices.

* * * * *